United States Patent
Ejiri et al.

(10) Patent No.: US 8,615,997 B2
(45) Date of Patent: Dec. 31, 2013

(54) ENGINE CONTROL APPARATUS AND METHOD

(75) Inventors: Arata Ejiri, Kawasaki (JP); Jun Sasaki, Kanagawa (JP)

(73) Assignees: Fujitsu Limited, Kawasaki (JP); Transtron Inc., Yokohama (JP)

( * ) Notice: Subject to any disclaimer, the term of this patent is extended or adjusted under 35 U.S.C. 154(b) by 358 days.

(21) Appl. No.: 12/887,927

(22) Filed: Sep. 22, 2010

(65) Prior Publication Data

US 2011/0077837 A1 Mar. 31, 2011

(30) Foreign Application Priority Data

Sep. 29, 2009 (JP) ................................ 2009-225532

(51) Int. Cl.
*F02B 33/44* (2006.01)

(52) U.S. Cl.
USPC ..... 60/605.2; 701/102; 701/108; 123/568.11; 123/568.21

(58) Field of Classification Search
USPC ............ 123/568.21; 701/101–104, 106, 108, 701/110, 115; 702/182, 186, 187; 73/114.69, 114.74; 60/602, 603, 605.2
See application file for complete search history.

(56) References Cited

U.S. PATENT DOCUMENTS

| | | | |
|---|---|---|---|
| 6,076,353 A * | 6/2000 | Freudenberg et al. | 60/605.2 |
| 6,209,530 B1 * | 4/2001 | Faletti et al. | 123/568.21 |
| 7,076,953 B2 * | 7/2006 | Kreso | 60/605.2 |
| 8,010,276 B2 * | 8/2011 | Oehlerking | 701/106 |
| 2008/0078176 A1 * | 4/2008 | de Ojeda | 60/605.2 |
| 2011/0077836 A1 * | 3/2011 | Ejiri et al. | 701/102 |

FOREIGN PATENT DOCUMENTS

| | | |
|---|---|---|
| JP | 11-132049 | 5/1999 |
| JP | 2001-214813 | 8/2001 |
| JP | 2002-155753 | 5/2002 |
| JP | 2005-214153 | 8/2005 |

* cited by examiner

*Primary Examiner* — Stephen K Cronin
*Assistant Examiner* — Carl Staubach
(74) *Attorney, Agent, or Firm* — Staas & Halsey LLP

(57) ABSTRACT

A dynamic feedforward amount to realize a predetermined transient response characteristic by compensating a transient response characteristic of an engine having a Variable Nozzle Turbo (VNT) and an Exhaust Gas Recirculator (EGR) is calculated for a nozzle opening degree of the VNT and a valve opening degree of the EGR. The transient response characteristic of the engine responds to a setting value of an injection quantity or the like. Then, command values of the nozzle opening degree of the VNT and the valve opening degree of the EGR are calculated by using the dynamic feedforward amount. In the transient state, the followingness to the target value is improved.

6 Claims, 13 Drawing Sheets

ENGINE CONTROL APPARATUS AND METHOD

CROSS-REFERENCE TO RELATED APPLICATIONS

This application is based upon and claims the benefit of priority of the prior Japanese Patent Application No. 2009-225532, filed on Sep. 29, 2009, the entire contents of which are incorporated herein by reference.

FIELD

This technique relates to a control technique of an engine.

BACKGROUND

In a recent engine (e.g. diesel engine), in order to reduce the emission and improve the fuel-efficiency, the Mass Air Flow (MAF) and Manifold Air Pressure (MAP) are controlled optimally by an intake gas control system.

Typically, the intake gas control system of the diesel engine includes a MAP control system and MAF control system, and MAP and MAF are independently controlled each other. In order to reduce Particulate Matters (PM) in the exhaust gas, the MAP control system controls a nozzle diameter of a Variable Nozzle Turbo (VNT) to control the MAP. On the other hand, in order to reduce nitrogen oxides (NOx) in the exhaust gas, the MAF control system controls a valve opening degree of an Exhaust Gas Recirculator (EGR) that recirculates the exhaust gas into a cylinder to control MAF. A design for these control systems is made that optimum MAP and MAF, which were experimentally determined according to driving conditions (e.g. injection quantity, engine speed), are used as target values to carry out the disturbance attenuation in a steady state.

Because an object of such a conventional control system is the disturbance suppression in the steady state in which the target value is constant, the delay of the response occurs in the transient state in which the target value itself changes. For example, when the injection quantity increases from A to B, it is an ideal that the MAP instantaneously changes from the state A to the state B and the disturbance suppression is carried out during the change. However, actually, a dynamic characteristic, such as the first-order time-lag, exists in a series of processes that the turbo engine speed increases by the increase of the exhaust gas pressure and the MAP finally increases. Therefore, there are problems that it is impossible for the control system to completely follow the target values of MAF and MAP, which are given according to the change of driving conditions, errors from the optimum MAP and MAF in the transient state occur, and the increase of the emission in the exhaust gas and the deterioration of the fuel-efficiency occurs accordingly.

For these problems, a conventional technique exists that the engine response is optimized by controlling an exhaust turbine supercharger during the transient time of an accelerator opening degree. In this conventional technique, a variable nozzle basic opening signal and a feed-forward term signal, which are calculated and outputted according to a variable nozzle opening basic map and a transient map for calculating the feed-forward term of the exhaust turbine supercharger by using the engine speed and the fuel injection quantity, are confluent at a confluent circuit. The opening degree of the variable nozzle is held at the value before transition of the accelerator opening degree by a variable nozzle throttling delay time computing circuit using the confluent signal and an accelerator opening transient signal, and the exhaust turbine supercharger is controlled so that the optimized engine response can be achieved by delaying throttling of the variable nozzle by using a variable nozzle throttling delay signal at the transient time of the accelerator opening degree. However, a valve opening degree of the EGR is not considered.

In addition, a conventional technique exists for a supercharged engine with an EGR device having an EGR rate feedback control system and a MAP feedback system and capable of reducing NOx and smoke in exhaust gas by conducting suitable EGR even when an engine operating state is in a transient state. The EGR rate feedback control system in the conventional technique calculates a target EGR rate from an engine speed, basic injection quantity of the fuel and map data, carries out PI control by using a difference between a measurement value and a calculated value, calculates basic EGR valve lift from the engine speed, the basic injection quantity of the fuel and another map data, and calculates a target EGR valve lift by adding the basic EGR valve lift to a result value of the PI control. In addition, the MAP feedback system calculates a target MAP from the engine speed, the basic injection quantity f the fuel and the map data, carries out the PI control by using the difference between the target MP and a measurement value of a MAP sensor, calculates a basic VNT lift from the engine speed, the basic injection quantity of the fuel and another map data, and calculates a target VNT lift by adding the basic VNT lift to a result value of the PI control. However, the map data to calculate the basic EGR valve lift and the map data to calculate the basic VNT lift are not disclosed in detail, and it is unclear what value is calculated.

SUMMARY

As described above, there is no conventional art that clearly discloses how the nozzle opening degree of the VNT and the valve opening degree of the EGR are controlled in a transient state to improve the followingness and enable the high-speed response.

As one aspect of this technique, an engine control method includes: (a) obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine; (b) first calculating, for a nozzle opening degree of said VNT and a valve opening degree of the EGR, dynamic feedforward amounts for realizing a predetermined transient response characteristic by compensating a transient response characteristic of the engine, which responds according to either of the setting value of the injection quantity and target values of the MAF and the MAP, which correspond to the setting values of the injection quantity and the engine speed; and (c) second calculating command values of the nozzle opening degree of the VNT and the valve opening degree of the EGR from control amounts of the valve opening degree of the EGR and the nozzle opening degree of the VNT, which are calculated from the target values of the MAP and the MAF and the measurement values of the MAP and the MAF, target values of the valve opening degree of the EGR and the nozzle opening degree of the VNT, which correspond to the setting values of the injection quantity and the engine speed, and the dynamic feedforward amounts for the nozzle opening degree of the VNT and the valve opening degree of the EGR.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
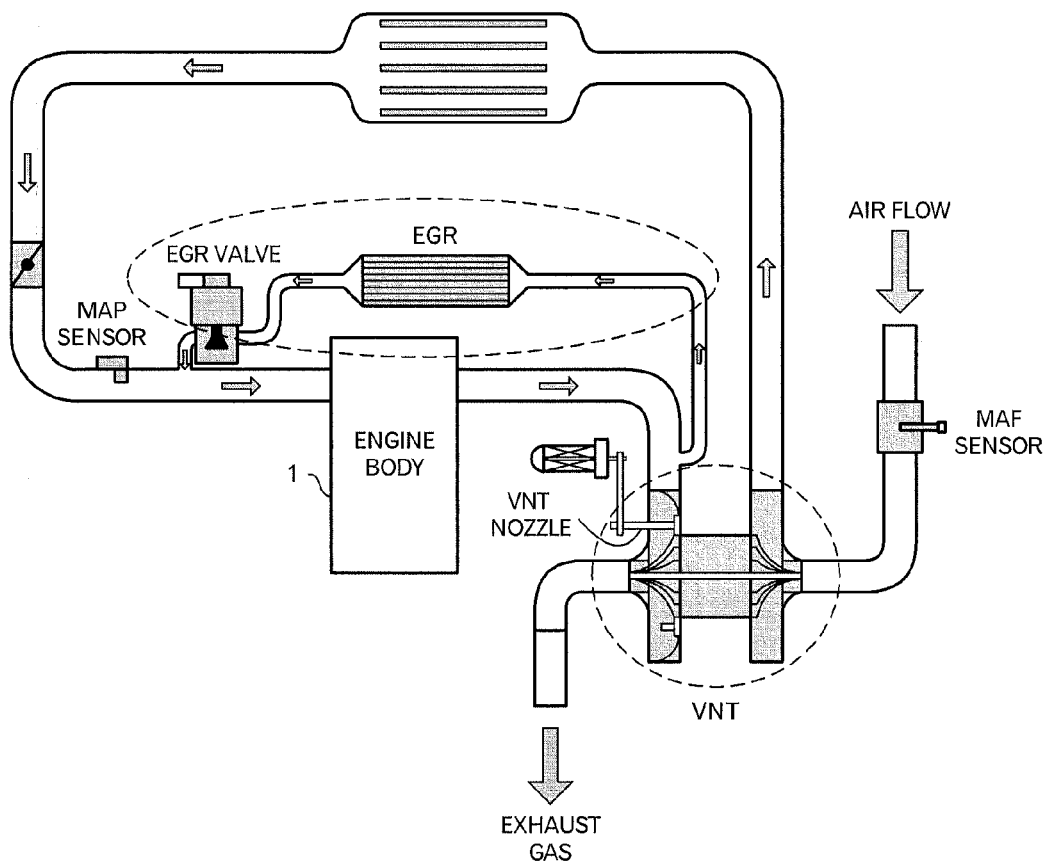
FIG. 1 is a schematic diagram of an engine.

FIG. 1 depicts an outline of a diesel engine as an engine relating to an embodiment of this technique. An Exhaust Gas Recirculator EGR to provide exhaust gas from an engine body 1 and a Variable Nozzle Turbo VNT to compress and provide fresh air to the engine body 1 by rotating a turbine by the pressure of the exhaust gas are coupled to the engine body 1. By adjusting a nozzle opening degree of the VNT, the rotation of the turbine of the VNT are adjusted, and a Manifold Air Pressure (MAP) measured by a MAP sensor is adjusted. On the other hand, by adjusting a valve opening degree of an EGR valve provided in the EGR, a Mass Air Flow (MAF) measured by a MAF sensor is adjusted.

Embodiment 1

Figure 2:
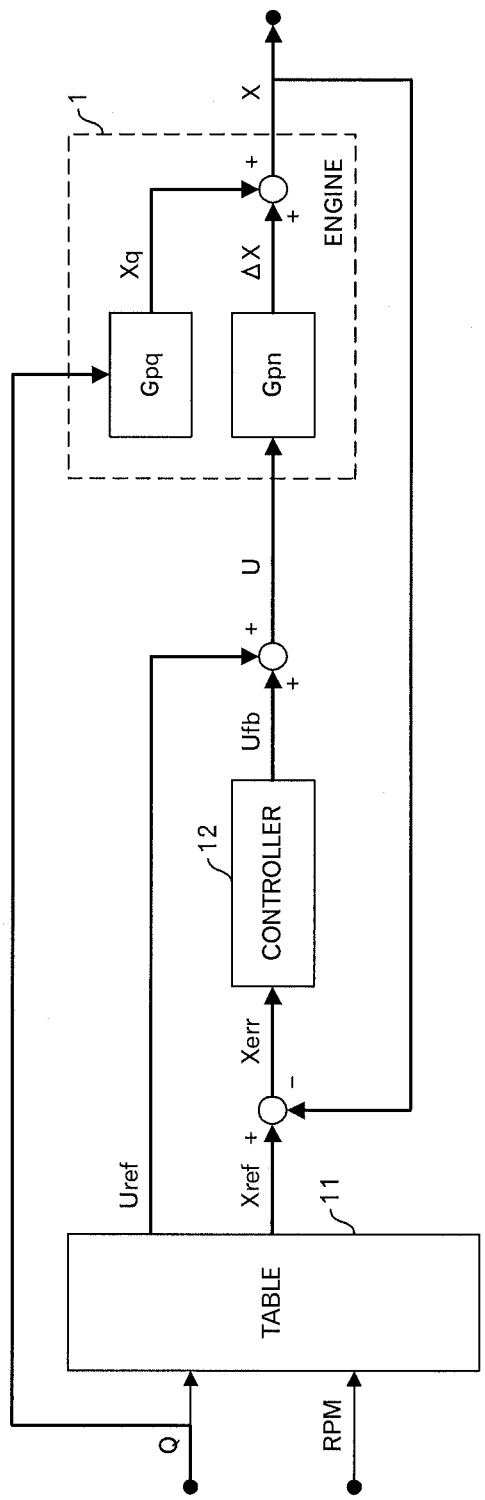
FIG. 2 is a block diagram to explain a control system of a conventional engine.

A conventional control system for such an engine is depicted by a block diagram as depicted in FIG. 2. Namely, setting values of an injection quantity Q and engine speed RPM are inputted, and target values Uref and Xref corresponding to the setting values of the injection quantity Q and engine speed RPM are read out from a table 11 in which a combination Uref (=[a target value of the EGR valve opening degree, a target value of the VNT nozzle opening degree]) of the target values of the EGR valve opening degree and the VNT nozzle opening degree and a combination Xref(=[$MAP_{ref}$, $MAF_{ref}$]) of the target values of the MAF and MAP are registered in association with a value of the injection quantity Q and a value of the engine speed RPM. Then, a difference Xerr between Xref and a combination X of the measurement values of the MAF and MAP is inputted to a controller 12, and the controller 12 calculates a combination Ufb of feedback control values of the EGR valve opening degree and the VNT nozzle opening degree. Furthermore, a command value U, which is a sum of Uref and Ufb, is calculated, and the command value U is inputted to a transfer function Gpn of a steady-state characteristic model of the engine body 1. The command value U is a combination (=[the valve opening degree of the EGR valve, the nozzle opening degree of the VNT]) of the valve opening degree of the EGR valve provided in the EGR and the nozzle opening degree of the VNT. Here, when Gpn is operated to U, $\Delta X$ is obtained. On the other hand, when a transfer function Gpq of a transient response characteristic (also called "transient characteristic" or "dynamic characteristic") of the engine body 1 is operated to the setting value of the injection quantity Q, Xq is obtained. Then, the operation of the engine body 1 is observed as a combination $X=Xq+\Delta X$ of the measurement value of the MAF by the MAF sensor and the measurement value of the MAP by the MAP sensor.

Thus, as for the command value U, only the steady-state characteristic of the engine body 1 is considered. Therefore, the transient response characteristic of the engine body 1 is not controlled at all.

Therefore, in this embodiment, a desired characteristic Gd is realized by compensating the transient response characteristic of the engine 1. Typically, Gd is represented by a first-order time-lag system having a certain time constant. The lesser the time constant is, the better the response becomes. However, because the control system may be unstable due to the influence of the noise or the like, an appropriate value is used for the time constant.

Figure 3:
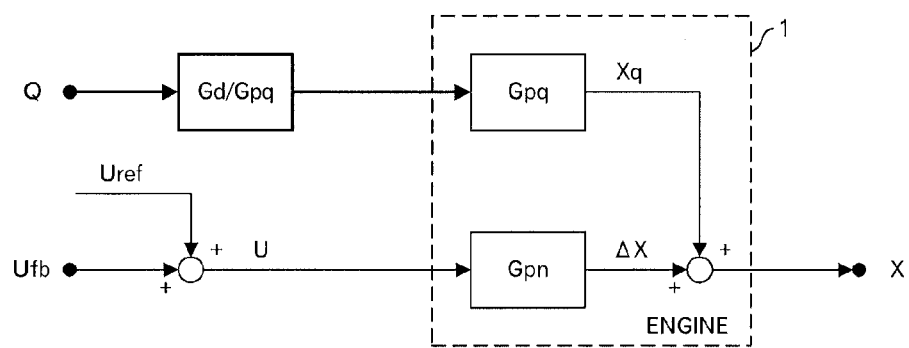
FIG. 3 is a diagram to explain assumption of a first embodiment.

Simply, as depicted in FIG. 3, it is considered that a transfer function Gd/Gpq introduced immediately before the transient response characteristic model of the engine body 1 and Xq=Gpq*Gd/Gpq*Q=Gd*Q is realized. However, because the transient response characteristic of the engine body 1 appears as a result, it is impossible to directly control the transient response characteristic of the engine body 1.

Figure 4:
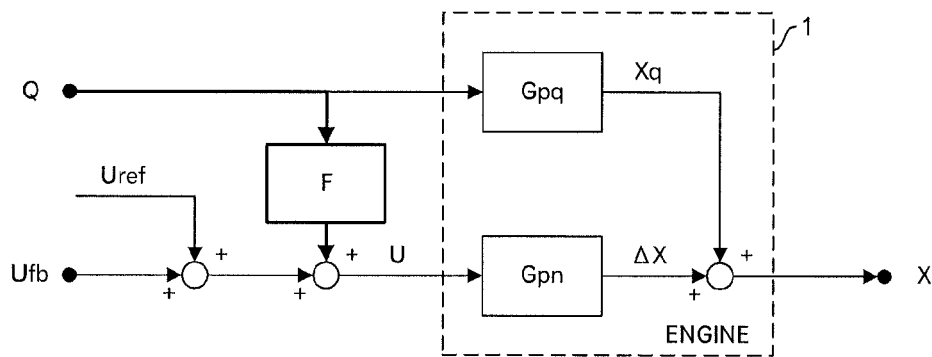
FIG. 4 is a diagram depicting a portion of a block diagram in the first embodiment.

Therefore, as depicted in FIG. 4, after operating the transfer function F to the injection quantity Q, an output of the transfer function F is added to a sum of Ufb and Uref to adjust the command value U. Then, by adjusting $\Delta X$ as a result, control is carried out so that a combination X of the measurement values of the MAF and MAP becomes desired values.

Figure 5:
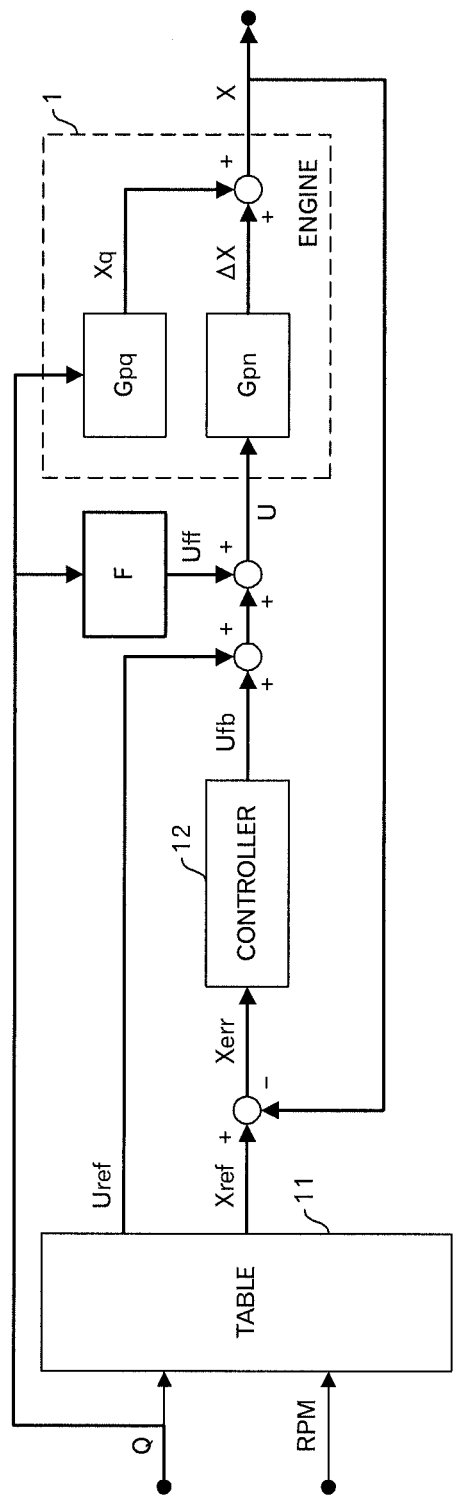
FIG. 5 is a block diagram of an engine control system in the first embodiment.

FIG. 5 depicts an entire control system. Namely, in the entire control system, the setting values of the injection quantity Q and the engine speed RPM are inputted, and Uref and Xref, which correspond to the setting values of the injection quantity Q and engine speed RPM, are read out from the table 11 depicted in FIG. 2. Then, a difference Xerr between Xref and the combination X of the measurement values of MAF and MAP is inputted to the controller 12, and the controller 12 calculates the combination Ufb of the feedback control values of the EGR valve opening degree and the VNT nozzle opening degree. After that, a new command value U is calculated by further adding Uff, which is a result obtained by operating the newly introduced transfer function F to the injection quantity Q, to the sum of Uref and Ufb. The command value U is inputted into the transfer function Gpn of the steady-state characteristic model of the engine body 1. Here, ΔX is obtained by operating Gpn to U. On the other hand, the setting value of the injection quantity Q is inputted to the transfer function Gpq of the transient response characteristic model of the engine body 1. Here, Xq is obtained by operating Gpq to Q. Then, the operation of the engine body 1 is observed as the combination X=Xq+ΔX of the measurement value of the MAF by the MAF sensor and the measurement value of the MAP by the MAP sensor.

Here, as for the transfer function F, a relation X=Gd/Gpq*Gpq*Q=Gd*Q is obtained in the transient state from FIG. 3. On the other hand, a relation X=Gpq*Q+F*Gpn*Q is obtained in the transient state from FIG. 4. Accordingly, because Gd*Q=Gpq*Q+F*Gpn*Q is obtained, Gd=Gpq+F*Gpn and F=(Gd−Gpq)/Gpn are obtained.

Thus, the transfer function F to be set is identified from the transfer function Gd of the desired characteristic, the transfer function Gpq of the transient response characteristic of the engine body 1 and the transfer function Gpn of the steady-state characteristic of the engine body 1.

Figure 6:
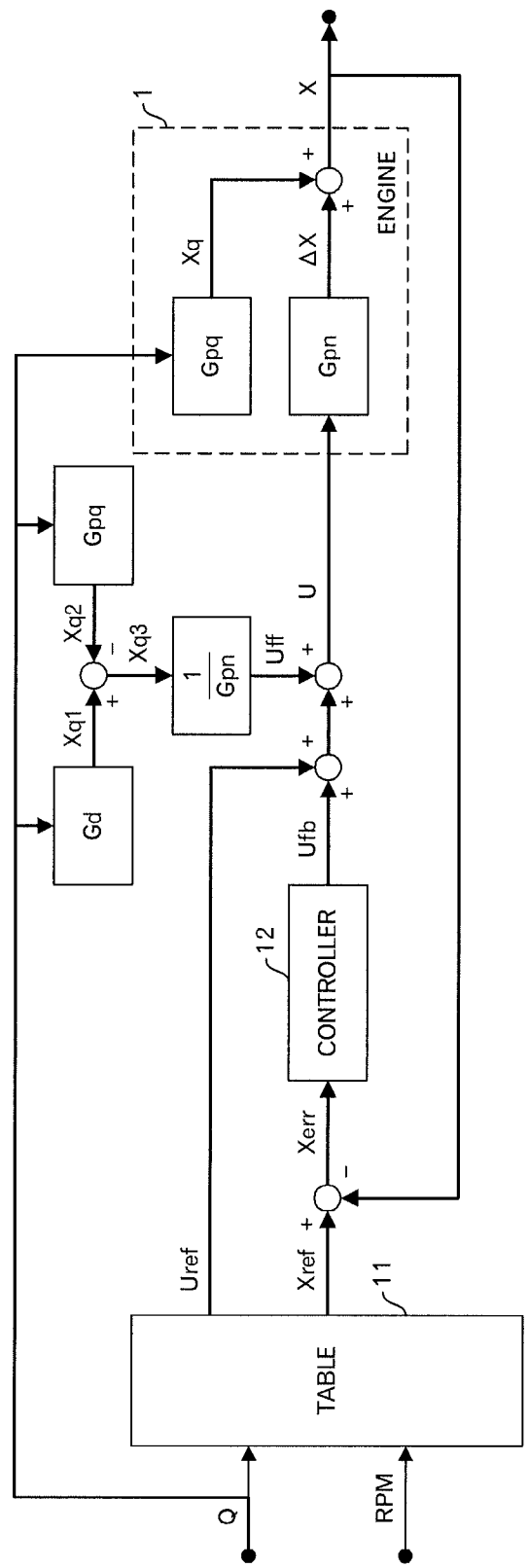
FIG. 6 is a detailed block diagram of the block diagram depicted in FIG. 5.

When the breakdown result of such a transfer function F is reflected, FIG. 5 is converted to FIG. 6. Namely, the setting values of the injection quantity Q and the engine speed RPM are inputted, and Uref and Xref, which correspond to the setting values of the injection quantity Q and the engine speed RPM, are read out from the same table 11 as a table in FIG. 2. Then, the difference Xerr between Xref and the combination X of the measurement values of the MAF and MAP is inputted to the controller 12, and the controller 12 calculates a combination Ufb (also called feedback amount) of the feedback control values of the EGR valve opening degree and the VNT nozzle opening degree. Furthermore, a sum of Uref and Ufb is calculated.

On the other hand, a first intermediate output Xq1 is obtained by operating the newly introduced transfer function Gd to the setting value of the injection quantity Q. In addition, a second intermediate output Xq2 is obtained by operating the transfer function Gpq corresponding to the transient response characteristic of the engine body 1 to the setting value of the injection quantity Q. Then, a third intermediate output Xq3 is calculated as a difference between the first intermediate output Xq1 and the second intermediate output Xq2, and a dynamic feedforward amount Uff is calculated by operating inverse conversion 1/Gpn of the transfer function Gpn corresponding to the steady-state characteristic of the engine body 1 to the third intermediate output Xq3.

Then, a new command value U is calculated by adding Uref, Ufb and Uff. The command value U is inputted to the transfer function Gpn of the steady-state characteristic model of the engine body 1.

Here, ΔX is obtained by operating Gpn to the command value U. On the other hand, Xq is obtained by operating the transfer function Gpq of the transient response characteristic model of the engine body 1 to the setting value of the injection quantity Q. Then, the operation of the engine body 1 is observed as a combination X (=Xq+ΔX) of the measurement value of the MAF by the MAF sensor and the measurement value of the MAP by the MAP sensor.

Here, Gpn is represented by a following expression.

$$\Delta X[t] = A_p * + B_p * U[t] \quad (1)$$

Thus, a value, which varies according to U[t], is added to a value depending on ΔX[t−1], which is a value before one unit time. Incidentally, Ap and Bp are matrices to which the steady-state characteristic of the actual engine body 1 is reflected.

$$A_p = \begin{bmatrix} A_{p11} & A_{p12} \\ A_{p21} & A_{p22} \end{bmatrix}$$

$$B_p = \begin{bmatrix} B_{p11} & B_{p12} \\ B_{p21} & B_{p22} \end{bmatrix}$$

In addition, Gpq is represented by a following expression.

$$Xq2[t] = A_q * Xq2[t-1] + B_q * Q[t] \quad (2)$$

Thus, a value, which varies according to Q[t], is added to a value depending on Xq2[t−1], which is a value before one unit time. Incidentally, Aq and Bq are matrices to which the transient response characteristic of the actual engine body 1 is reflected.

$$A_q = \begin{bmatrix} A_{q11} & A_{q12} \\ A_{q21} & A_{q22} \end{bmatrix}$$

$$B_q = \begin{bmatrix} B_{q11} & B_{q12} \\ B_{q21} & B_{q22} \end{bmatrix}$$

Furthermore, Gd is represented by a following expression.

$$Xq1[t] = A_d * Xq1[t-1] + B_d * Q[t] \quad (3)$$

Thus, a value, which varies according to Q[t], is added to a value depending on Xq1[t−1], which is a value before one unit time. Incidentally, Ad and Bd are matrices corresponding to the desired characteristics.

$$A_d = \begin{bmatrix} A_{d11} & A_{d12} \\ A_{d21} & A_{d22} \end{bmatrix}$$

$$B_d = \begin{bmatrix} B_{d11} & B_{d12} \\ B_{d21} & B_{d22} \end{bmatrix}$$

Furthermore, a following expression is defined.

$$Xq3[t] = Xq1[t] - Xq2[t] \quad (4)$$

Then, 1/Gpn is obtained as described below by transforming the expression (1).

$$B_p * U[t] = \Delta X[t] - A_p * \Delta X[t-1]$$

$$U[t] = B_p^{-1} \{ \Delta X[t] - A_p * \Delta X[t-1] \}$$

Therefore, a following expression is obtained.

$$Uff = B_p^{-1} \{ Xq3[t] - A_p * Xq3[t-1] \} \quad (5)$$

Figure 7:
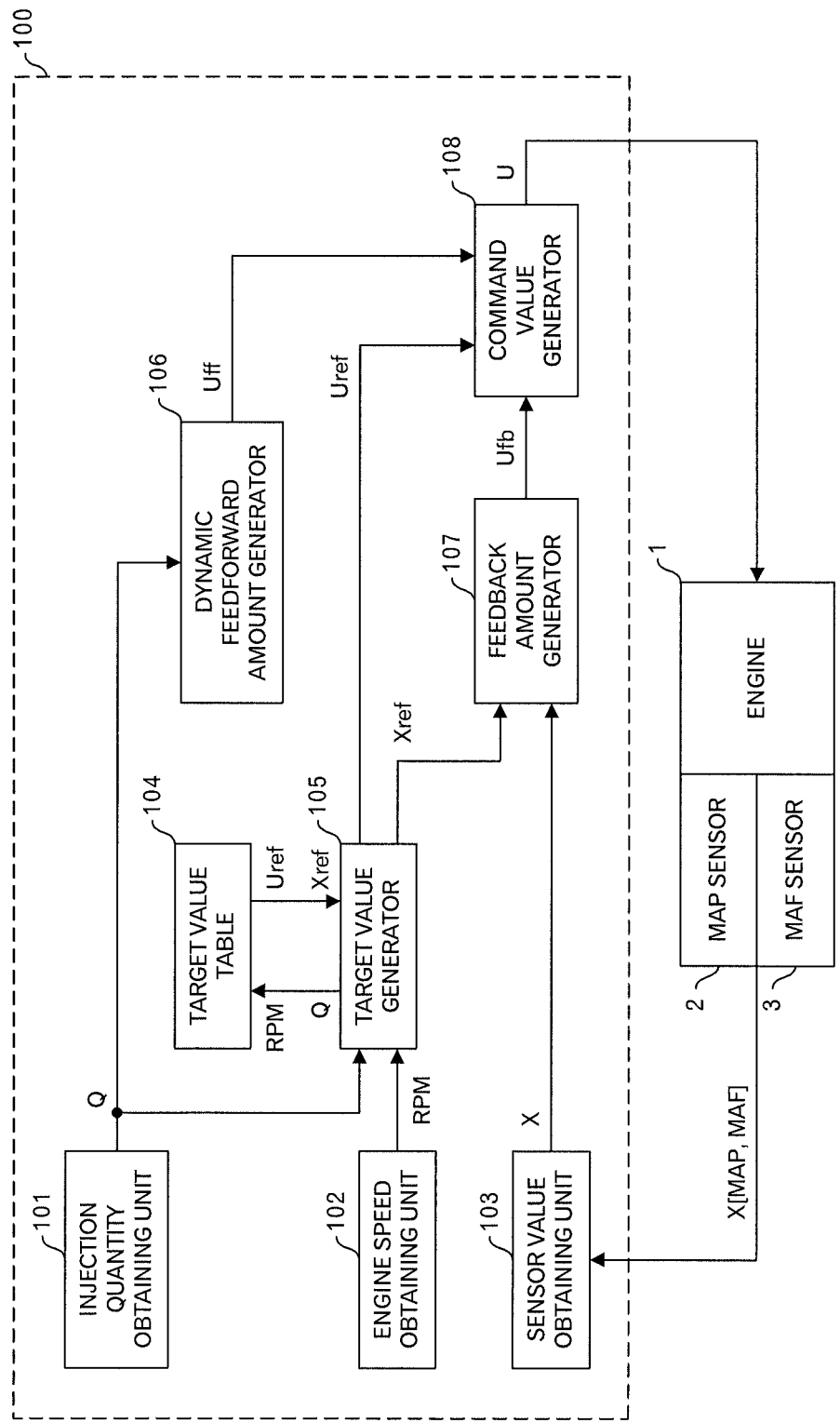
FIG. 7 is a functional block diagram of an engine control apparatus in the first embodiment.

Under such assumption, an engine control apparatus 100 relating to this embodiment has a configuration as depicted in FIG. 7. Incidentally, the engine body 1 includes the MAP sensor 2 and the MAF sensor 3. In addition, the setting values of the injection quantity and engine speed are values set in response to an instruction from a driver or the like, and provided to the engine control apparatus 100 from the outside. Incidentally, in some cases, an injection quantity measurement unit and engine speed measurement unit may be provided and the setting values may be provided from those units.

The engine control apparatus 100 includes (a) an injection quantity obtaining unit 101 to obtain the setting value of the injection quantity Q; (b) an engine speed obtaining unit 102 to obtain the setting value of the engine speed RPM; (c) a sensor value obtaining unit 103 to obtain a combination X of the measurement values of the MAF and the MAP from the MAP sensor 5 and the MAF sensor 6; (d) a target table 104 in which Uref and Xref are registered in association with the values of the injection quantity and engine speed; (e) a target value generator 105 to accept the setting value of the injection quantity Q outputted from the injection quantity obtaining unit 101 and the setting value of the engine speed RPM outputted from the engine speed obtaining unit 102 and to read out corresponding Uref and Xref from the target value table 104; (f) a dynamic feedforward amount generator 106 to accept the setting value of the injection quantity Q outputted from the injection quantity obtaining unit 101 and to calculate the feedforward amount Uff by carrying out calculations described later; (g) a feedback amount generator 107 to calculate the feedback amount Ufb by using X outputted by the sensor obtaining unit 103 and Xref outputted by the target value generator 105; and (h) a command value generator 108 to accept an output Uff from the dynamic feedforward amount generator 106, an output Uref from the target value generator 105 and an output Ufb from the feedback amount generator 107, and to generate and output to the engine body 1, the command value U.

Incidentally, as described above, the combination of the values of the EGR valve opening degree and the VNT nozzle opening degree is represented by U (=[the value of the EGR valve opening degree, the value of the VNT nozzle opening degree]), and the combination of the values of the MAF and MAP is represented by X (=[MAP, MAF]).

Figure 8:
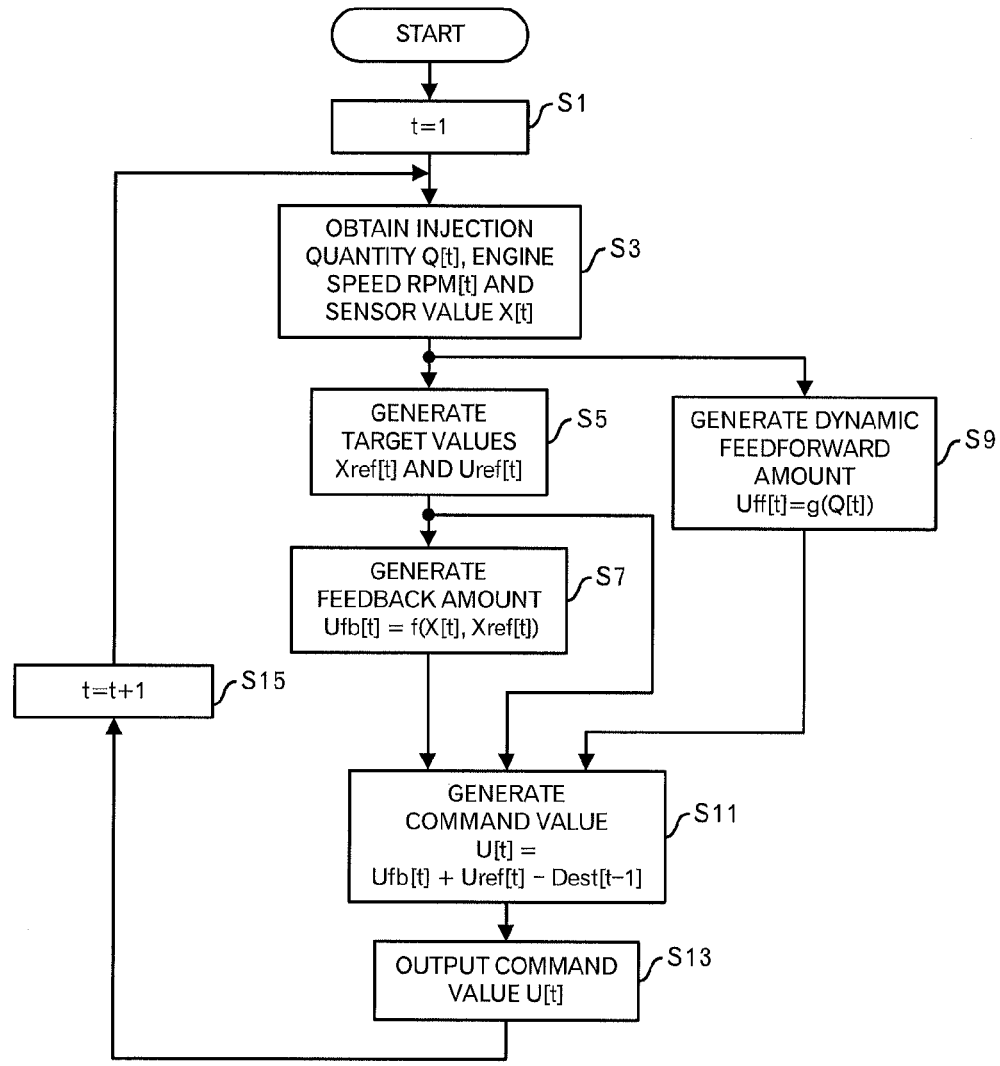
FIG. 8 is a diagram depicting a processing flow of a processing carried out by the engine control apparatus in the first embodiment.

Next, processing contents of the engine control apparatus 100 will be explained by using FIG. 8. First, at the beginning of the operation, t=1 is set as the time (step S1). Then, the injection quantity obtaining unit 101, engine speed obtaining unit 102 and sensor value obtaining unit 103 obtains the setting value Q[t] of the injection quantity, the setting value RPM[t] of the engine speed and the sensor value X[t] (step S3).

Then, the target value generator 105 generates the target values Xref[t] and Uref[t], which correspond to the setting value Q[t] of the injection quantity and the setting value RPM[t] of the engine speed, by reading out them from the target value table 104 (step S5). In addition, the feedback amount generator 107 generates the feedback amount Ufb[t] (=f(X[t], Xref[t])) from the target value Xref[t] generated by the target value generator 105 and the sensor value X[t] obtained by the sensor value obtaining unit 103 (step S7). Incidentally, because the feedback amount Ufb[t] is a value generated by the same controller 12 as the conventional one, the detailed explanation is omitted.

On the other hand, in parallel with the steps S5 and S7, the dynamic feedforward amount generator 106 generates the dynamic feedforward amount Uff[t] by using the setting value Q[t] of the injection quantity from the injection quantity obtaining unit 101 (step S9). Uff[t]=g(Q[t]) is obtained, and g(Q[t]) represents calculations represented by the expressions (2) to (5).

Then, the command value generator 108 calculates the command value U[t] by adding the output Uref[t] of the target value generator 105, the output Uff[t] of the dynamic feedforward amount generator 106 and the output Ufb[t] of the feedback amount generator 107 (step S11). Namely, U[t]=Ufb[t]+Uref[t]+Uff[t] is calculated. As described above, U[t] is a combination (=[valve opening degree of EGR valve, nozzle opening degree of VNT]) of the valve opening degree of the EGR valve provided in the EGR and the nozzle opening degree of the VNT.

Finally, the command value generator 108 outputs the command value U[t] to the engine body 1 (step S13), and the engine body 1 adjusts the valve opening degree of the EGR valve and the nozzle opening degree of the VNT according to the command value U[t].

Then, the time t is incremented by "1" (step S15), and the processing returns to the step S3 until the operation of the engine body 1 stops.

By carrying out aforementioned processing, it becomes possible to give the desired characteristic in the transient state by compensating the transient response characteristic of the engine body 1. Specifically, the followingness is improved in the transient state and the high-speed response is enabled.

Embodiment 2

Figure 9:
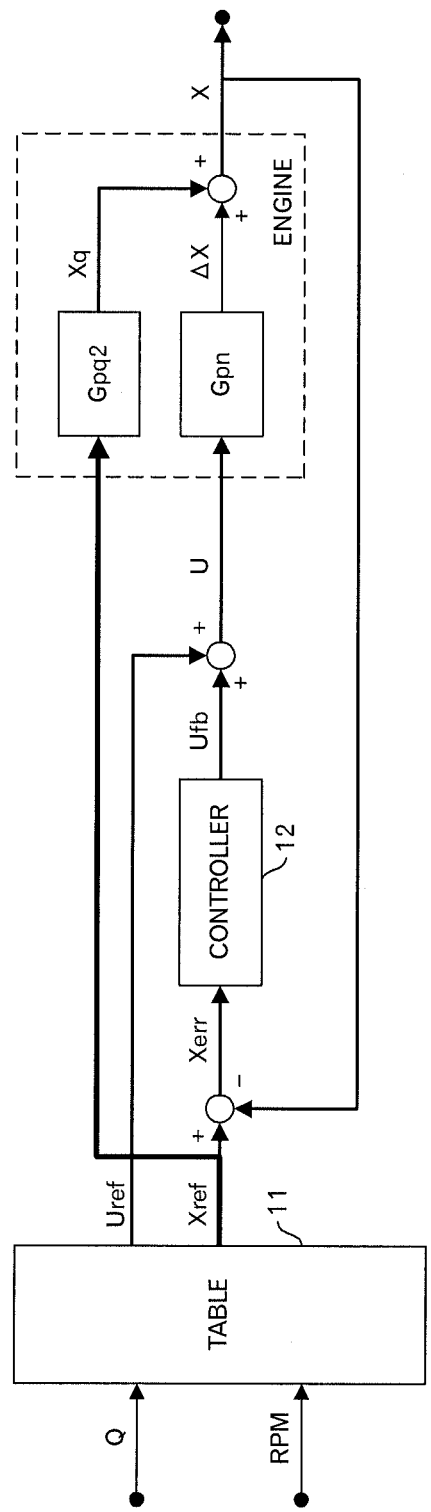
FIG. 9 is a diagram to explain assumption of a second embodiment.

In the first embodiment, as depicted in FIG. 2, the transient response characteristic of the engine body 1 is defined as a characteristic, which causes the output value Xq to vary according to the injection quantity Q. On the other hand, as depicted in FIG. 2, because the combination Xref (=[$MAF_{ref}$, $MAP_{ref}$]) of the target values of the MAF and MAP, which correspond to the injection quantity Q and the engine speed RPM, is obtained from the table 11, the transient response characteristic of the engine body 1 can be modeled as a characteristic, which causes the output value Xq to vary according to Xref, as depicted in FIG. 9.

Namely, the setting values of the injection quantity Q and the engine speed RPM are inputted, and Uref and Xref, which correspond to the setting values of the injection quantity Q and the engine speed RPM, are read out from the table 11, in which the combination Uref (=[the target value of the EGR valve opening degree, the target value of the VNT nozzle opening degree]) of the target values of the EGR valve opening degree and the VNT nozzle opening degree and the combination Xref (=[$MAF_{ref}$, $KAP_{ref}$]) of the target values of the MAF and MAP are registered in association with the values of the injection quantity Q and the engine speed RPM. Then, a difference Xerr between Xref and the combination X of the measurement values of the MAF and MAP is inputted into the controller 12, and the controller 12 calculates the combination Ufb of the feedback control values of the EGR valve opening degree and the VNT nozzle opening degree. Furthermore, the command value U, which is a sum of Uref and Ufb, is calculated, and the command value U is inputted into the transfer function Gpn of the steady-state characteristic of the engine body 1. The command value U is a combination (=[the EGR valve opening degree, the VNT nozzle opening degree]) of the valve opening degree of the EGR valve provided in the EGR and the nozzle opening degree of the VNT. Here, ΔX is obtained by operating Gpn to U.

On the other hand, the combination Xref (=[$MAF_{ref}$, $MAP_{ref}$]) of the target values of the MAF and MAP is inputted to the transfer function Gpq2 of the transient response characteristic model of the engine body 1. Here, Xq is obtained by operating Gpq2 to Xref. Then, the operation of the engine body 1 is observed as the combination X=Xq+ΔX of the measurement value of the MAF by the MAF sensor and the measurement value of the MAP by the MAP sensor.

Thus, as for the command value U, only the steady-state characteristic of the engine body 1 is considered. Therefore, the transient response characteristic of the engine body 1 is not controlled at all.

Then, similarly to the first embodiment, after operating the transfer function F2 to Xref, the output of the transfer function F2 is further added to a sum of Ufb and Uref to adjust the command value U. After that, by adjusting ΔX as a result, control is carried out so that the combination X of the measurement values of the MAF and MAP becomes desired values.

Figure 10:
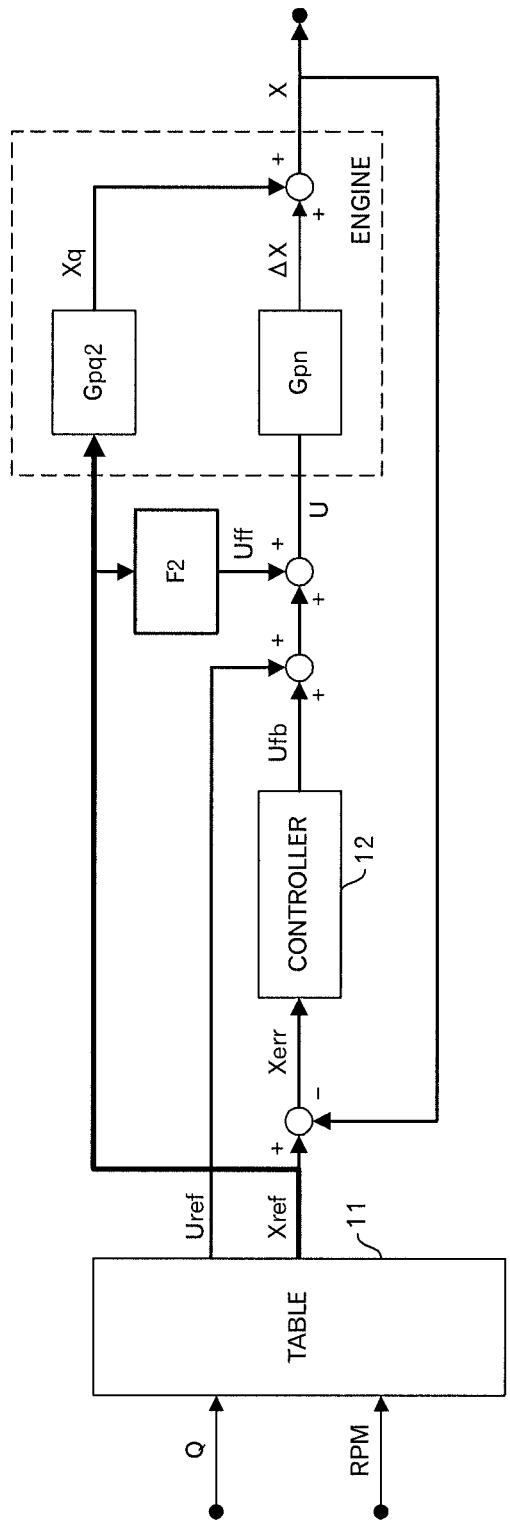
FIG. 10 is a block diagram of an engine control system in the second embodiment.

The entire control system relating to this embodiment is depicted in FIG. 10. Namely, the setting values of the injection quantity Q and the engine speed RPM are inputted, and Uref and Xref, which correspond to the setting values of the injection quantity Q and engine speed RPM, are read out from the same table 11 as a table in FIG. 9. Then, a difference Xerr between Xref and the combination X of the measurement values of MAF and MAP is inputted to the controller 12, and the controller 12 calculates the combination Ufb of the feedback control values of the EGR valve opening degree and the VNT nozzle opening degree. Furthermore, a new command value U is calculated by adding Uff, which is a result obtained by operating a newly introduced transfer function F2 to Xref, to the sum of Uref and Ufb. The command value U is inputted to the transfer function Gpn of the steady-state characteristic model of the engine body 1. Here, the ΔX is obtained by operating Gpn to U. On the other hand, Xref is inputted to the transfer function Gpq2 of the transient response characteristic model of the engine body 1. Here, Xq is obtained by operating Gpq2 to Xref. Then, the operation of the engine body 1 is observed as the combination X=Xq+ΔX of the measurement value of the MAF by the MAF sensor and the measurement value of the MAP by the MAP sensor.

Here, the transfer function F2 is represented similarly to the first embodiment.

$$F2=(Gd2-Gpq2)/Gpn$$

Thus, the transfer function F2 to be set is identified from the transfer function Gd2 of the desired characteristic, the transfer function Gpq2 of the transient response characteristic of the engine body 1 and the transfer function Gpn of the steady-state characteristic.

Figure 11:
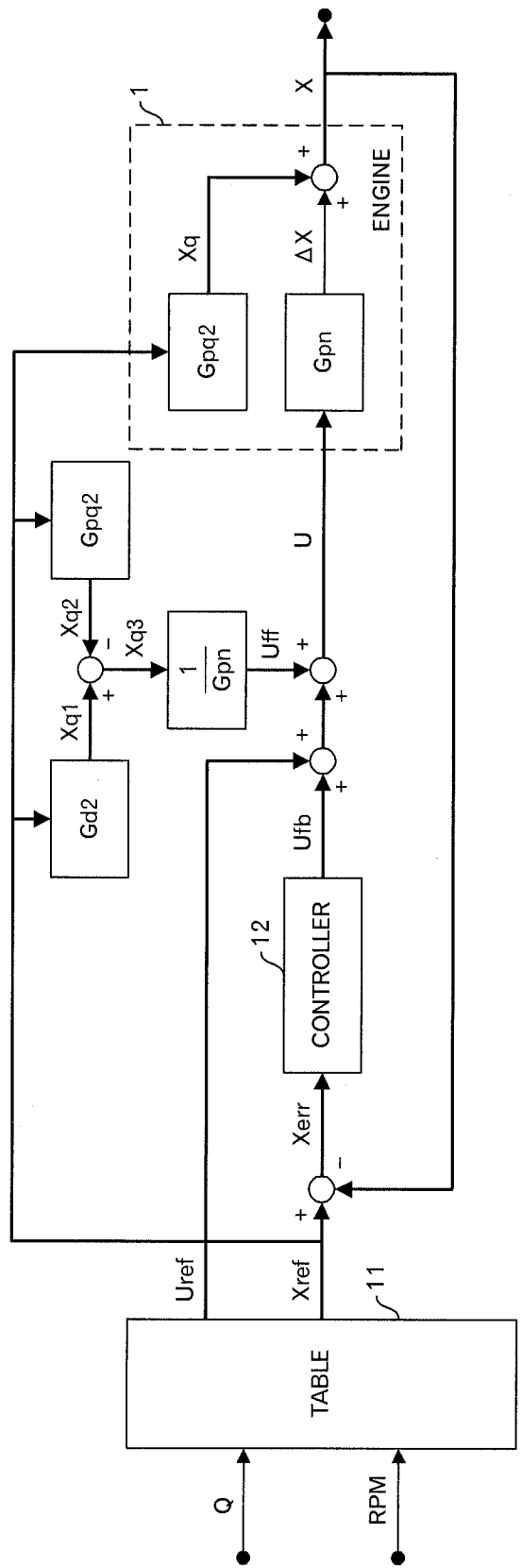
FIG. 11 is a block diagram of the engine control system in the second embodiment.

Thus, when the breakdown result of such a transfer function F2 is reflected, FIG. 10 is converted to FIG. 11. Namely, when the setting values of the injection quantity Q and engine speed RPM are inputted, Uref and Xref, which correspond to the setting values of the injection quantity Q and the engine speed RPM, are read out from the same table 11 as a table in FIG. 9. Then, a difference Xerr between the measurement values of the MAF and MAP is inputted to the same controller 12 as a controller in FIG. 9, and the controller 12 calculates the combination Ufb (also called "feedback amount") of the feedback control values of the EGR valve opening degree and the VNT nozzle opening degree. Furthermore, a sum of Uref and Ufb is calculated.

On the other hand, a first intermediate output Xq1 is obtained by operating the newly introduced transfer function Gd2 to Xref. In addition, a second intermediate output Xq2 is obtained by operating the transfer function Gpq2 corresponding to the transient response characteristic of the engine body 1 to Xref. Then, a third intermediate output Xq3 is calculated as a difference between the first intermediate output Xq1 and the second intermediate output Xq2, and a dynamic feedforward amount Uff is calculated by operating inverse conversion 1/Gpn of the transfer function Gpn corresponding to the steady-state characteristic of the engine body 1 to the third intermediate output Xq3.

Then, a third intermediate output Xq3 is calculated as a difference between the first intermediate output Xq1 and the second intermediate output Xq2, and a dynamic feedforward amount Uff is calculated by operating inverse conversion 1/Gpn of the transfer function Gpn corresponding to the steady-state characteristic of the engine body 1 to the intermediate output Xq3.

Then, a new command value U is calculated by adding Uref, Ufb and Uff. The command value U is inputted to the transfer function Gpn of the steady-state characteristic model of the engine body 1.

Here, ΔX is obtained by operating Gpn to the command value U. On the other hand, Xq is obtained by operating the transfer function Gpq2 of the transient response characteristic model of the engine body 1 to Xref. Then, the operation of the engine body 1 is observed as a combination X (=Xq+ΔX) of the measurement value of the MAF by the MAP sensor and the measurement value of the MAP by the MAP sensor.

Here, Gpn is represented by the expression (1), similarly to the first embodiment.

Gpq2 is represented by a following expression.

$$Xq2[t]=A_q*Xq2[t-1]+B_{q2}*Xref[t] \qquad (6)$$

Thus, a value, which varies according to Xref[t], is added to a value depending on Xq2[t−1], which is a value before one unit time. Incidentally, Aq and Bq2 are matrices to which the transient characteristic of the actual engine body 1 is reflected.

$$B_{q2} = \begin{bmatrix} B_{q211} & B_{q212} \\ B_{q221} & B_{q222} \end{bmatrix}$$

Furthermore, Gd2 is represented by a following expression.

$$Xq1[t]=A_d*Xq1[t-1]+B_{d2}*Xref[t] \qquad (7)$$

Thus, a value, which varies according to Xref[t], is added to a value depending on Xq1[t−1], which is a value before one unit time. Incidentally, Ad and Bd are matrices corresponding to the desired characteristics.

$$B_{d2} = \begin{bmatrix} B_{d211} & B_{d212} \\ B_{d221} & B_{d222} \end{bmatrix}$$

Furthermore, a following expression is defined.

$$Xq3[t]=Xq1[t]-Xq2[t] \qquad (4)$$

Then, a expression (5) is obtained, similarly to the first embodiment.

Figure 12:
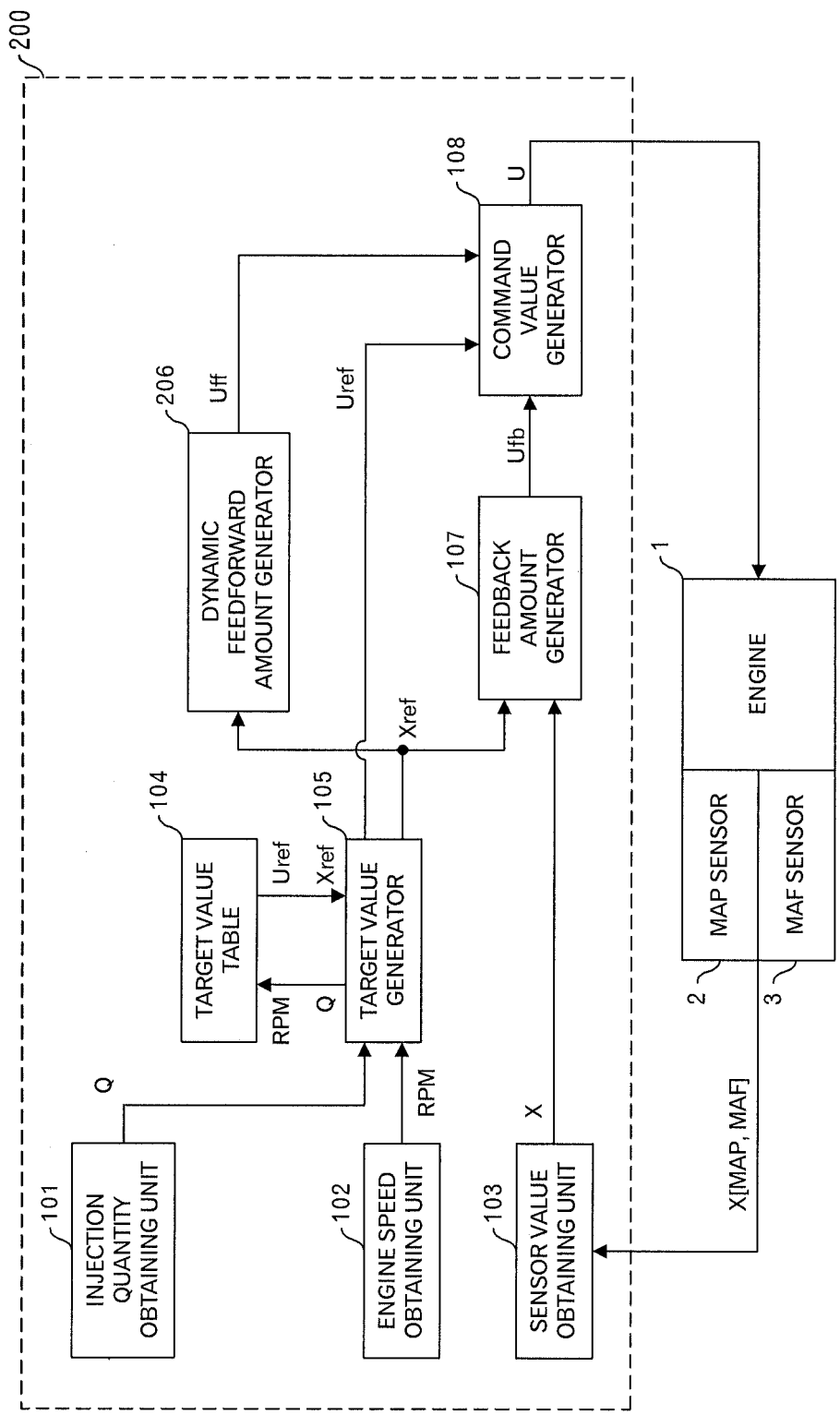
FIG. 12 is a functional block diagram of the engine control apparatus in the second embodiment.

Under such assumption, an engine control apparatus 200 relating to this embodiment has a configuration as depicted in FIG. 12. Incidentally, the same reference numbers are attached to the same elements as the first embodiments. Incidentally, the engine body 1 includes the MAP sensor 2 and the MAF sensor 3. In addition, the setting values of the injection quantity Q and engine speed RPM are values set in response to an instruction from a driver or the like, and provided to the engine control apparatus 200 from the outside. Incidentally, in some cases, an injection quantity measurement unit and engine speed measurement unit may be provided and the setting values may be provided from those units.

The engine control apparatus 200 includes (a) an injection quantity obtaining unit 101 to obtain the setting value of the injection quantity Q; (b) an engine speed obtaining unit 102 to obtain the setting value of the engine speed RPM; (c) a sensor value obtaining unit 103 to obtain a combination X of the measurement values of the MAF and the MAP from the MAP sensor 2 and the MAF sensor 3; (d) a target table 104 in which Uref and Xref are registered in association with the values of the injection quantity and engine speed; (e) a target value generator 105 to accept the setting value of the injection quantity Q outputted from the injection quantity obtaining unit 101 and the setting value of the engine speed RPM outputted from the engine speed obtaining unit 102 and to read out corresponding Uref and Xref from the target value table 104; (f) a dynamic feedforward amount generator 206 to accept the Xref outputted from the target value generator 105 and to calculate the feedforward amount Uff by carrying out calculations described later; (g) a feedback amount generator 107 to calculate the feedback amount Ufb by using X outputted by the sensor obtaining unit 103 and Xref outputted by the target value generator 105; and (h) a command value generator 108 to accept an output Uff from the dynamic feedforward amount generator 206, an output Uref from the target value generator 105 and an output Ufb from the feedback amount generator 107, and to generate and output to the engine body 1, the command value U.

Incidentally, as described above, the combination of the values of the EGR valve opening degree and the VNT nozzle opening degree is represented by U (=[the value of the EGR valve opening degree, the value of the VNT nozzle opening degree]), and the combination of the values of the MAF and MAP is represented by X (=[MAP, MAF]).

Figure 13:
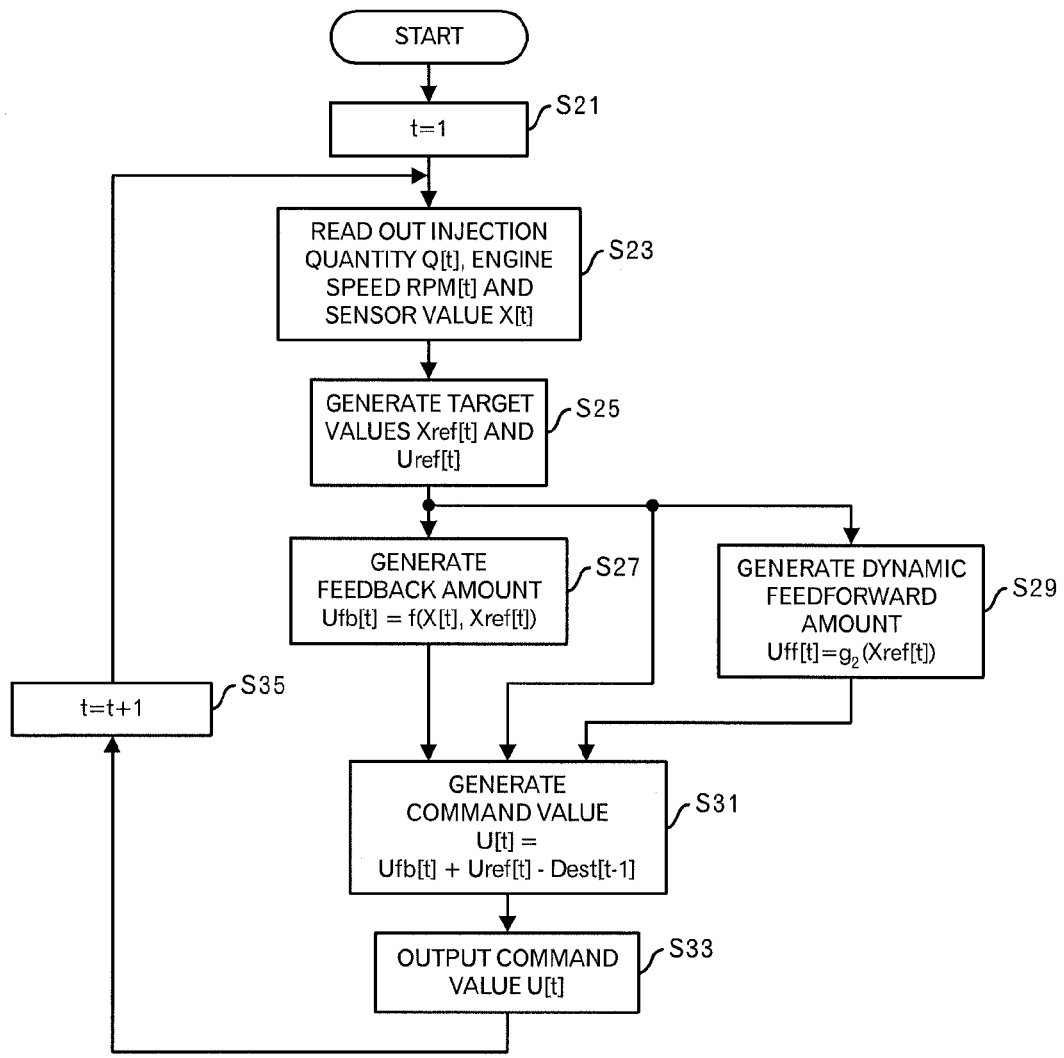
FIG. 13 is a diagram depicting a processing flow of a processing carried out by the engine control apparatus in the second embodiment.

Next, processing contents of the engine control apparatus 200 will be explained by using FIG. 13. First, at the beginning of the operation, t=1 is set as the time (step S21). Then, the injection quantity obtaining unit 101, engine speed obtaining unit 102 and sensor value obtaining unit 103 obtain the setting value Q[t] of the injection quantity, the setting value RPM[t] of the engine speed and the sensor value X[t] (step S23).

Then, the target value generator 105 generates the target values Xref[t] and Uref[t], which correspond to the setting value Q[t] of the injection quantity and the setting value RPM[t] of the engine speed, by reading out them from the target value table 104 (step S25). In addition, the feedback amount generator 107 generates the feedback amount Ufb[t] (=f(X[t], Xref[t])) from the target value Xref[t] generated by the target value generator 105 and the sensor value X[t] obtained by the sensor value obtaining unit 103 (step S27). Incidentally, because the feedback amount Ufb[t] is a value generated by the same controller 12 as the conventional one, the detailed explanation is omitted.

On the other hand, in parallel with the step S27, the dynamic feedforward amount generator 206 generates the dynamic feedforward amount Uff[t] by using Xref from the target value generator 105 (step S29). Uff[t]=g2 (Xref[t]) is obtained, and g2 (Xref[t]) represents calculations represented by the expressions (4) to (7).

Then, the command value generator 108 calculates the command value U[t] by adding the output Uref[t] of the target value generator 105, the output Uff[t] of the dynamic feedforward amount generator 206 and the output Ufb[t] of the feedback amount generator 107 (step S31). Namely, U[t]=Ufb[t]+Uref[t]+Uff[t] is calculated. As described above, U[t] is a combination (=[valve opening degree of EGR valve, nozzle opening degree of VNT]) of the valve opening degree of the EGR valve provided in the EGR and the nozzle opening degree of the VNT.

Finally, the command value generator 108 outputs the command value U[t] to the engine body 1 (step S33), and the engine body 1 adjusts the valve opening degree of the EGR valve and the nozzle opening degree of the VNT according to the command value U[t].

Then, the time t is incremented by "1" (step S35), and the processing returns to the step S23 until the operation of the engine body 1 stops.

By carrying out aforementioned processing, it becomes possible to give the desired characteristic in the transient state by compensating the transient response characteristic of the engine body 1. Specifically, the followingness is improved in the transient state and the high-speed response is realized.

Figure 14:
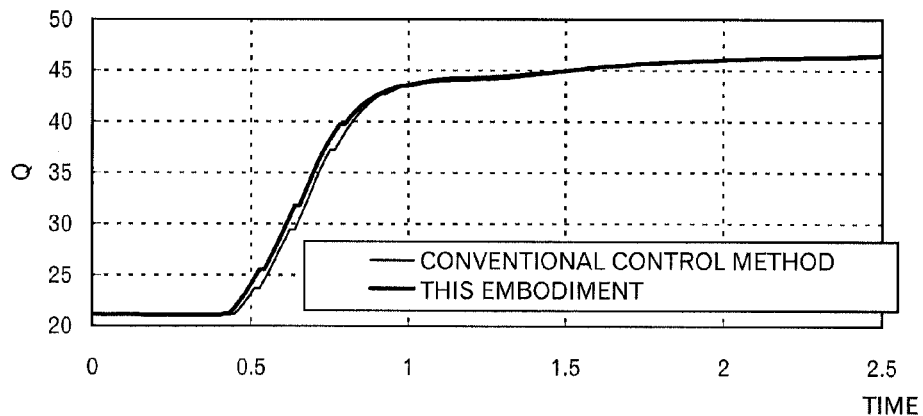
FIG. 14 is a diagram depicting an example of time change of the injection quantity Q.
Figure 15:
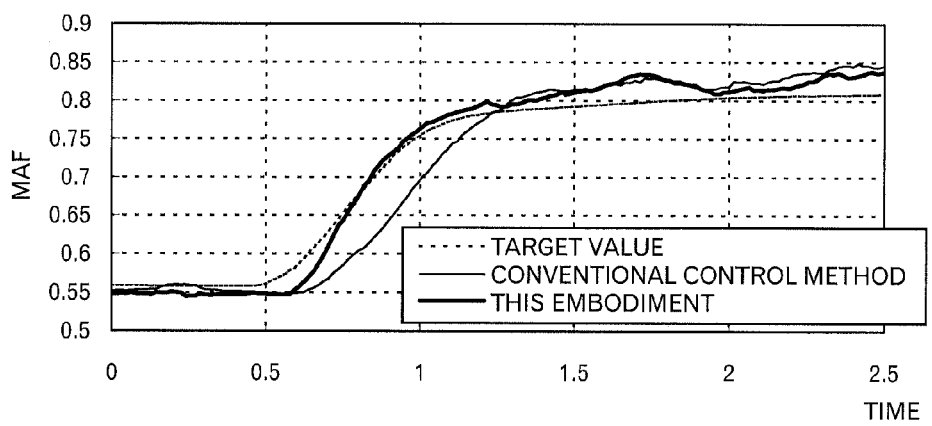
FIG. 15 is a diagram representing a relation between the MAF measurement values by the conventional technique and this embodiment for the MAF target value.
Figure 16:
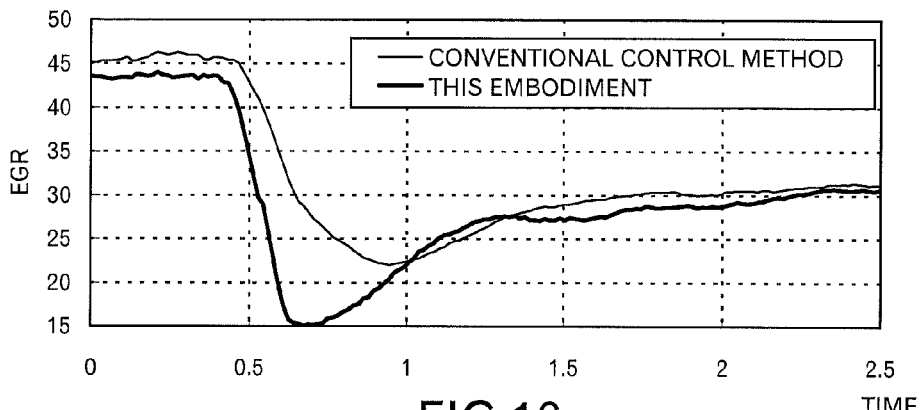
FIG. 16 is a diagram representing time change of the valve opening degree of the EGR valve.

An example of an effect of the embodiments of this technique will be explained by using FIGS. 14 to 16. For example, as depicted in FIG. 14, the injection quantity Q is changed similarly even in case of using the conventional technique and even in case of using this embodiment. Then, as depicted in FIG. 15, the target value of the MAF changes in time base. Here, when the conventional art is carried out, the measurement value of the MAF cannot follow the target value well. On the other hand, when the embodiment is carried out, the measurement value of the MAF can almost follow the target value. FIG. 16 depicts time change of the valve opening degree of the EGR valve, and it can be grasped that the control values are different between the conventional art and the embodiments. In this embodiment, a large change of the valve opening degree occurs at a time when the target value of the MAF begins to change, and accordingly the followingness to the target value of the MAF is improved and the high-speed response is realized.

Although embodiments of this technique was explained, this technique is not limited to these embodiments. For example, the functional block diagrams as depicted in FIGS. 7 and 12 are mere examples, and the program module configuration in these embodiments does not always correspond to the actual program module configuration.

In addition, the engine is not limited to the diesel engine, and this technique can be applied to the engine having EGR and VNT.

Figure 17:
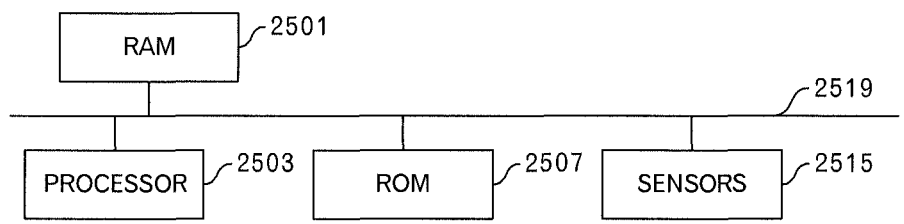
FIG. 17 is a functional block diagram of a computer.

Incidentally, the engine control apparatuses as depicted in FIGS. 7 and 12 are computer apparatuses. That is, a Random Access memory (RAM) 2501, a processor 2503, a Read Only Memory (ROM) 2507 and sensors 2515 are connected through a bus 2519 as shown in FIG. 17. A control program for carrying out the processing in the embodiment (and an Operating System (OS) if it exists) is stored in the ROM 2507, and when executed by the processor 2503, they are read out from the ROM 2507 to the RAM 2501. The processor 2503 controls the sensors (MAP sensor 2 and MAF sensor 3. According to circumstances, injection quantity measurement unit and engine speed measurement unit), and obtains measurement values. In addition, intermediate processing data is stored in the RAM 2501. Incidentally, the processor 2503 may include the ROM 2507, and may further include the RAM 2501. In this embodiment, the control program for carrying out the aforementioned processing may be distributed by a computer-readable storage removable disk in which the control program is recorded, and the control program may be written into the ROM 2507 by a ROM writer. In the computer apparatus as stated above, the hardware such as the processor 2503 and RAM 2501 and the ROM 2507 and the control program (and OS if it exists) systematically cooperate with each other, so that various functions as described above in details are realized.

However, it is possible to implements the entire engine control apparatus only by the hardware. In addition, these embodiments are outlined as follows:

An engine control method includes: (a) obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine; (b) first calculating, for a nozzle opening degree of said VNT and a valve opening degree of the EGR, dynamic feedforward amounts for realizing a predetermined transient response characteristic by compensating a transient response characteristic of the engine, which responds according to either of the setting value of the injection quantity and target values of the MAF and the MAP, which correspond to the setting values of the injection quantity and the engine speed; and (c) second calculating command values of the nozzle opening degree of the VNT and the valve opening degree of the EGR from control amounts of the valve opening degree of the EGR and the nozzle opening degree of the VNT, which are calculated from the target values of the MAP and the MAF and the measurement values of the MAP and the MAF, target values of the valve opening degree of the EGR and the nozzle opening degree of the VNT, which correspond to the setting values of the injection quantity and the engine speed, and the dynamic feedforward amounts for the nozzle opening degree of the VNT and the valve opening degree of the EGR.

Because it becomes possible to realize a predetermined transient response characteristic by compensating the transient response characteristic embodied on the engine, it is possible to improve the target value followingness and enable the high-speed response even when, for example, the target value of the MAF or MAP rapidly changes.

The first calculating may include: (b1) calculating first values of the nozzle opening degree of the VNT and the valve opening degree of the EGR based on a first model of the predetermined transient response characteristic, wherein an output of the first model varies according to either of the setting value of the injection quantity and target values of the MAF and the MAP, which correspond to the setting values of the injection quantity and the engine speed; (b2) calculating second values of the nozzle opening degree of the VNT and the valve opening degree of the EGR based on a second model of the transient response characteristic of the engine, wherein an output of the second model varies according to either of the setting value of the injection quantity and target values of the MAF and the MAP, which correspond to the setting values of the injection quantity and the engine speed; and (b3) calculating, the dynamic feedforward amount for the nozzle opening degree of the VNT and the valve opening degree of the EGR, based on a third model for removing influence of a steady-state characteristic of the engine for a difference between the first and second values.

By carrying out such calculations, after removing the influence of the original transient response characteristic and steady-state characteristic of the engine, the predetermined transient characteristic can be realized.

Incidentally, the aforementioned predetermined transient response characteristic may have a first-order time-lag characteristic having a predetermined time constant. By appropriately setting the time constant, it becomes possible to conduct stable high-speed response.

Furthermore, this method may further include reading out the target values of the MAP and the MAF, which correspond to the setting values of the injection quantity and the engine speed, from a table in which target values of the MAP and the MAF are registered in association with values of the injection quantity and the engine speed. Such a table may be stored in a memory, and the read target values may be calculated without using the table.

This method may further include reading out the target values of the valve opening degree of the EGR and the nozzle opening degree of the VNT, which correspond to the setting values of the injection quantity and the engine speed, from a table in which target values of the valve opening degree of the EGR and the nozzle opening degree of the VNT are registered in association with values of the injection quantity and the engine speed. Such a table may be stored in a memory, and the read target values may be calculated without using the table.

Figure 18:
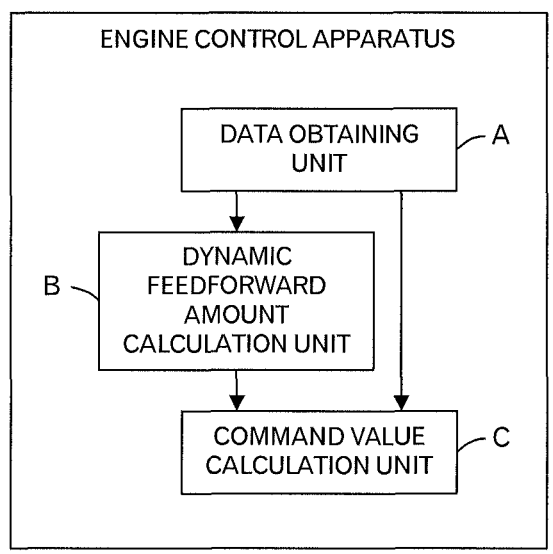
FIG. 18 is a functional block diagram of an engine control apparatus.

This engine control apparatus as depicted in FIG. 18 includes: (A) a data obtaining unit to obtain a setting value of an injection quantity to an engine having an Exhaust Gas Recirculator (EGR) and a Variable Nozzle Turbo (VNT), a setting value of an engine speed, a measurement value of a Manifold Air Pressure (MAP) of the engine and a measurement value of a Mass Air Flow (MAF) of the engine; (B) a dynamic feedforward amount calculation unit to calculate, for a nozzle opening degree of the VNT and a valve opening degree of the EGR, dynamic feedforward amounts for realizing a predetermined transient response characteristic by compensating a transient response characteristic of the engine, which responds according to either of the setting value of the injection quantity and target values of the MAF and the MAP, which correspond to the setting values of the injection quantity and the engine speed; and (C) a command value calculation unit to calculate command values of the nozzle opening degree of the VNT and the valve opening degree of the EGR from control amounts of the valve opening degree of the EGR and the nozzle opening degree of the VNT, which are calculated from the target values of the MAP and the MAF and the measurement values of the MAP and the MAF, target values of the valve opening degree of the EGR and the nozzle opening degree of the VNT, which correspond to the setting values of the injection quantity and the engine speed, and the dynamic feedforward amounts for the nozzle opening degree of the VNT and the valve opening degree of the EGR.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing an engine control program for causing a processor to execute a process, comprising:

obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine;

first calculating, for a nozzle opening degree of said VNT and a valve opening degree of said EGR, dynamic feedforward amounts for realizing a predetermined transient response characteristic by compensating a transient response characteristic of said engine, wherein said transient response characteristic of said engine responds to either of said setting value of said injection quantity and target values of said MAF and said MAP, which correspond to said setting values of said injection quantity and said engine speed; and second calculating command values of said nozzle opening degree of said VNT and said valve opening degree of said EGR from control amounts of said valve opening degree of said EGR and said nozzle opening degree of said VNT, which are calculated from said target values of said MAP and said MAF and said measurement values of said MAP and said MAF, target values of said valve opening degree of said EGR and said nozzle opening degree of said VNT, which correspond to said setting values of said injection quantity and said engine speed, and said dynamic feedforward amounts for said nozzle opening degree of said VNT and said valve opening degree of said EGR, wherein said first calculating comprises:

calculating first values of said nozzle opening degree of said VNT and said valve opening degree of said EGR based on a first model of said predetermined transient response characteristic, wherein an output of said first model varies to either of said setting value of said injection quantity and target values of said MAF and said MAP, which correspond to said setting values of said injection quantity and said engine speed;

calculating second values of said nozzle opening degree of said VNT and said valve opening degree of said EGR based on a second model of said transient response characteristic of said engine, wherein an output of said second model varies to either of said setting value of said injection quantity and target values of said MAF and said MAP, which correspond to said setting values of said injection quantity and said engine speed; and calculating said dynamic feedforward amount for said nozzle opening degree of said VNT and said valve opening degree of said EGR based on a third model for removing influence of a steady-state characteristic of said engine for a difference between said first and second values.

2. The non-transitory computer-readable storage medium as set forth in claim 1, wherein said predetermined transient response characteristic has a first-order time-lag characteristic having a predetermined time constant.

3. The non-transitory computer-readable storage medium as set forth in claim 1, wherein said process further comprises:

reading out said target values of said MAP and said MAF, which correspond to said setting values of said injection quantity and said engine speed, from a table in which target values of said MAP and said MAF are registered in association with values of said injection quantity and said engine speed.

4. The non-transitory computer-readable storage medium as set forth in claim 1, wherein said process further comprises:

reading out said target values of said valve opening degree of said EGR and said nozzle opening degree of said VNT, which correspond to said setting values of said injection quantity and said engine speed, from a table in which target values of said valve opening degree of said EGR and said nozzle opening degree of said VNT are registered in association with values of said injection quantity and said engine speed.

5. An engine control method, comprising:

obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine;

first calculating, for a nozzle opening degree of said VNT and a valve opening degree of said EGR, dynamic feedforward amounts for realizing a predetermined transient response characteristic by compensating a transient response characteristic of said engine using first and second models of said transient response characteristic of said engine, wherein said transient response characteristic of said engine responds to either of said setting value of said injection quantity and target values of said MAF and said MAP, which correspond to said setting values of said injection quantity and said engine speed; and second calculating command values of said nozzle opening degree of said VNT and said valve opening degree of said EGR from control amounts of said valve opening degree of said EGR and said nozzle opening degree of said VNT, which are calculated from said target values of said MAP and said MAF and said measurement values of said MAP and said MAF, target values of said valve opening degree of said EGR and said nozzle opening degree of said VNT, which correspond to said setting values of said injection quantity and said engine speed, and said dynamic feedforward amounts for said nozzle opening degree of said VNT and said valve opening degree of said EGR.

6. An engine control apparatus, comprising:

a data obtaining unit to obtain a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine;

a dynamic feedforward amount calculation unit to calculate, for a nozzle opening degree of said VNT and a valve opening degree of said EGR, dynamic feedforward amounts for realizing a predetermined transient response characteristic by compensating a transient response characteristic of said engine using first and second models of said transient response characteristic of said engine, wherein said transient response characteristic of said engine responds to either of said setting value of said injection quantity and target values of said MAF and said MAP, which correspond to said setting values of said injection quantity and said engine speed; and a command value calculation unit to calculate command values of said nozzle opening degree of said VNT and said valve opening degree of said EGR from control amounts of said valve opening degree of said EGR and said nozzle opening degree of said VNT, which are calculated from said target values of said MAP and said MAF and said measurement values of said MAP and said MAF, target values of said valve opening degree of said EGR and said nozzle opening degree of said VNT, which correspond to said setting values of said injection quantity and said engine speed, and said dynamic feedforward amounts for said nozzle opening degree of said VNT and said valve opening degree of said EGR.

* * * * *